United States Patent
Wu

(10) Patent No.: US 11,025,046 B2
(45) Date of Patent: Jun. 1, 2021

(54) POWER SWITCH CIRCUIT

(71) Applicant: uPI semiconductor corp., Zhubei (TW)

(72) Inventor: Chia-Lung Wu, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 0 days.

(21) Appl. No.: 16/811,168

(22) Filed: Mar. 6, 2020

(65) Prior Publication Data

US 2020/0313418 A1  Oct. 1, 2020

(30) Foreign Application Priority Data

Mar. 29, 2019 (TW) .................................. 108203921

(51) Int. Cl.
*H02H 1/00* (2006.01)
*H02H 9/04* (2006.01)

(52) U.S. Cl.
CPC ............ *H02H 1/0007* (2013.01); *H02H 9/04* (2013.01)

(58) Field of Classification Search
CPC ......... H02H 1/0007; H02H 9/04; H02H 9/025
USPC ....................................................... 361/86
See application file for complete search history.

(56) References Cited

U.S. PATENT DOCUMENTS

| | | | |
|---|---|---|---|
| 8,081,410 B1 * | 12/2011 | Wang .................... | H02J 7/0029 361/93.1 |
| 8,159,281 B2 | 4/2012 | Chang et al. | |
| 2003/0128489 A1 * | 7/2003 | Katoh ..................... | G05F 1/575 361/93.9 |
| 2008/0151444 A1 * | 6/2008 | Upton .................. | H02H 7/0833 361/31 |
| 2012/0176178 A1 | 7/2012 | Yang et al. | |
| 2014/0285935 A1 * | 9/2014 | Tsai ....................... | H02H 3/087 361/86 |

\* cited by examiner

*Primary Examiner* — Dharti H Patel
(74) *Attorney, Agent, or Firm* — McClure, Qualey & Rodack, LLP

(57) ABSTRACT

A power switch circuit is disclosed. The power switch circuit includes a switch circuit, a first current protection circuit, a second current protection circuit and a selection circuit. The switch circuit is coupled between an input terminal and an output terminal. The switch circuit includes a first sensing switch, a second sensing switch and a power switch. The first sensing switch, the second sensing switch and the power switch are the same cell. The first current protection circuit is coupled to the second sensing switch. The second current protection circuit is coupled to the first sensing switch. The selection circuit is coupled to the switch circuit, first current protection circuit and second current protection circuit. The selection circuit generates a selection signal according to an output voltage to selectively enable the first current protection circuit or second current protection circuit.

11 Claims, 3 Drawing Sheets

POWER SWITCH CIRCUIT

BACKGROUND OF THE INVENTION

1. Field of the Invention

The invention relates to power switch; in particular, to a power switch circuit.

2. Description of the Prior Art

As shown in FIG. 1, in a conventional power switch circuit 1, a sense resistor LRM is usually coupled in series with a power switch M as a sensing method of over-current protection (OCP) or short-current protection (SCP).

However, since the conventional sensing resistor LRM is made of a metal layer, it occupies a large area because it is operated at a high voltage and has a small resistance, and component errors are easily generated due to line width, materials or post-processing, etc., the accuracy of current sensing is also affected (the error is about 30%). In addition, an amplifier circuit is disposed in the over-current/short-circuit current protection circuit 10 to amplify the above-mentioned current sensing error, so that the stability of the output voltage is seriously affected. The above problems need to be solved urgently.

SUMMARY OF THE INVENTION

Therefore, the invention provides a power switch circuit to solve the above-mentioned problems occurred in the prior arts.

An embodiment of the invention is a power switch circuit. In this embodiment, the power switch circuit is coupled between an input terminal and an output terminal. The power switch circuit receives an input voltage and provides an output voltage. The power switch circuit includes a switch circuit, a first current protection circuit, a second current protection circuit and a selection circuit. The switch circuit is coupled between the input terminal and the output terminal. The switch circuit includes a first sensing switch, a second sensing switch and a power switch. The first sensing switch, the second sensing switch and the power switch are the same cell. The first current protection circuit is coupled to the second sensing switch. The second current protection circuit is coupled to the first sensing switch. The selection circuit is coupled to the switch circuit, first current protection circuit and second current protection circuit. The selection circuit generates a selection signal according to the output voltage to selectively enable the first current protection circuit or second current protection circuit.

In an embodiment, the first sensing switch, the power switch and the second sensing switch are common gate.

In an embodiment, the selection circuit compares the output voltage with a default voltage to obtain a comparing result and generates the selection signal according to the comparing result.

In an embodiment, when the output voltage is less than a default voltage, the selection circuit generates the selection signal having a first level to enable the second current protection circuit.

In an embodiment, when the output voltage is greater than a default voltage, the selection circuit generates the selection signal having a second level to enable the first current protection circuit.

In an embodiment, the power switch and the second sensing switch are coupled to the input terminal, and the power switch and the first sensing switch are coupled to the output terminal.

In an embodiment, the first current protection circuit obtains a first sensing current signal through the second sensing switch and provides a control voltage to the switch circuit according to the first sensing current signal.

In an embodiment, when the first sensing current signal is a first default value, an on-resistance of the power switch is controlled by the control voltage, so that an output current flowing through the power switch maintains a second default value.

In an embodiment, the second current protection circuit obtains a second sensing current signal through the first sensing switch and provides a control voltage to the switch circuit according to the second sensing current signal.

In an embodiment, when the second sensing current signal is a third default value, an on-resistance of the power switch is controlled by the control voltage, so that an output current flowing through the power switch maintains a fourth default value.

In an embodiment, the power switch circuit further includes a current mirror circuit coupled between the second sensing witch and the first current protection circuit.

Compared to the prior arts, the power switch circuit of the invention uses sub-cells of its power switch to sense the current flowing through the power switch instead of using conventional metal resistors coupled in series, the current sensing error can be greatly reduced. Because the sensing voltages are all high voltages, they are not controlled based on the conventional error amplification signal (low voltage), so that the current sensing error can be greatly reduced to within 5%.

The power switch circuit of the invention clamps an upper limit of the output current (IL) through the current protection circuit and clamps a lower limit of the output current through the short-circuit current protection circuit, so that it can provide more stable and accurate output current.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
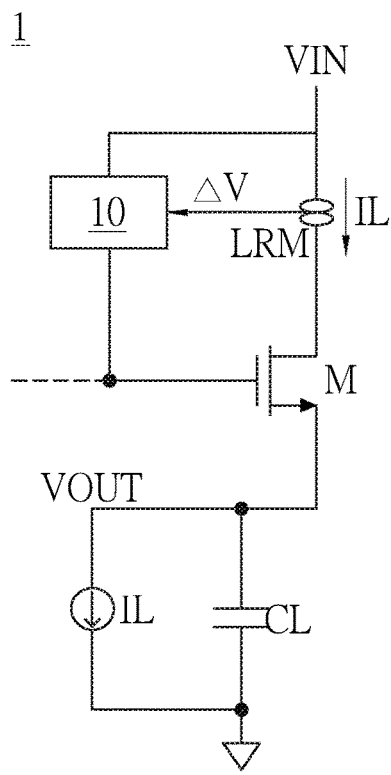
FIG. 1 illustrates a schematic diagram of a sense resistor coupled in series with a power switch as a sensing method of over-current protection (OCP) or short-current protection (SCP) in a conventional power switch circuit 1.

Reference will now be made in detail to the exemplary embodiments, the same or similar reference numbers or components used in the drawings and the embodiments are used to represent the same or similar parts.

A specific embodiment of the invention is a power switch circuit. In this embodiment, the power switch circuit has an over-current protection (OCP) function and a short-circuit current protection (SCP) function, which can greatly reduce the current sensing error and provide a more stable and accurate output current.

Figure 2:
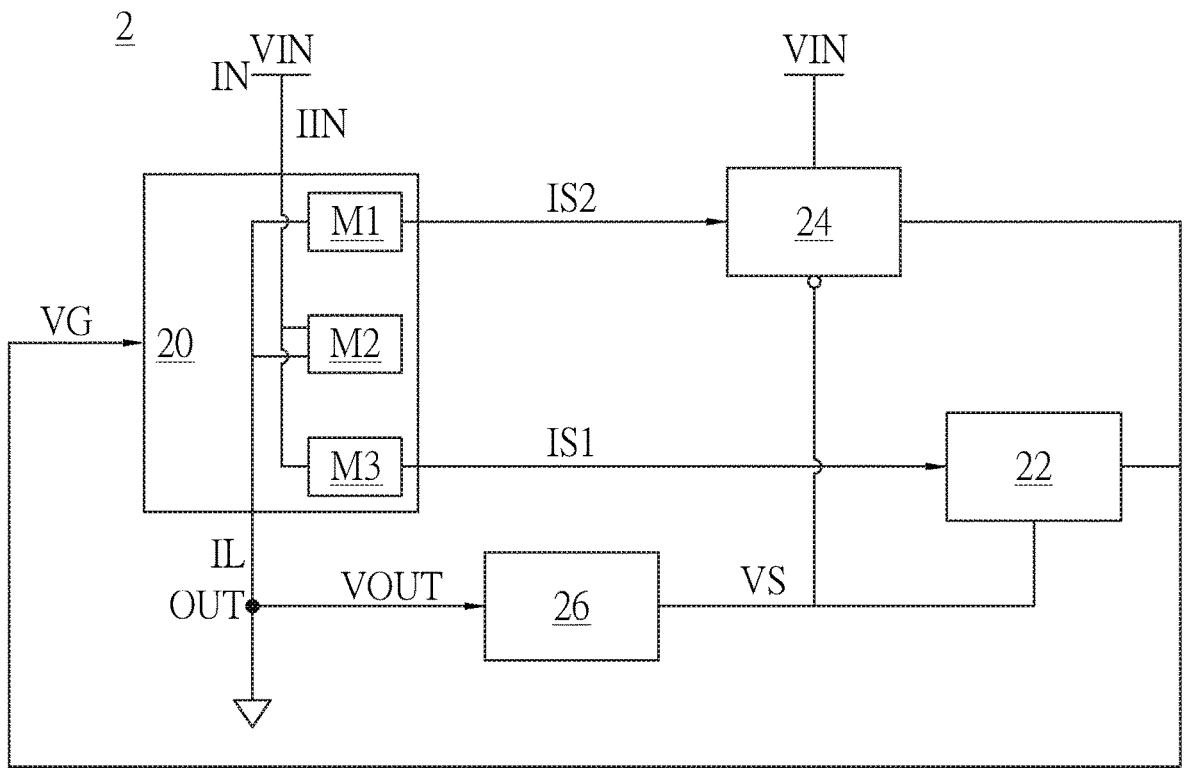
FIG. 2 illustrates a schematic diagram of a power switch circuit 2 in an embodiment of the invention.

Please refer to FIG. 2. FIG. 2 illustrates a schematic diagram of the power switch circuit in this embodiment. As shown in FIG. 2, the power switch circuit 2 is coupled between an input terminal IN and an output terminal OUT and receives an input voltage VIN and provides an output voltage VOUT. The power switch circuit 2 includes a switch circuit 20, a first current protection circuit 22, a second current protection circuit 24 and a selection circuit 26. The first current protection circuit 22 can be an over-current protection (OCP) circuit and the second current protection circuit 24 can be a short-circuit current protection (SCP) circuit, but not limited to this.

The switch circuit 20 is coupled between the input terminal IN and the output terminal OUT. The switch circuit 20 is also coupled to the first current protection circuit 22, the second current protection circuit 24 and the selection circuit 26 respectively. The first current protection circuit 22 is coupled to the switch circuit 20, the second current protection circuit 24 and the selection circuit 26 respectively. The second current protection circuit 24 is coupled to the switch circuit 20, the first current protection circuit 22 and the selection circuit 26 respectively. The selection circuit 26 is coupled to the switch circuit 20, the first current protection circuit 22 and the second current protection circuit 24 respectively.

The switch circuit 20 includes a first sensing switch M1, a second sensing switch M3 and a power switch M2. The first sensing switch M1, the second sensing switch M3 and the power switch M2 are common gate and their operations are all controlled by a control voltage VG. The control voltage VG is provided by the first current protection circuit 22 or the second current protection circuit 24.

It should be noted that the switch circuit 20 is a single cell, which can be divided into three sub-cells as the first sensing switch M1, the second sensing switch M3 and the power switch M2. In this invention, the area of the power switch M2 will be much larger than the area of the first sensing switch M1 and the second sensing switch M3, and the area of the second sensing switch M3 is larger than the area of the first sensing switch M1. That is to say, the area of the power switch M2>>the area of the second sensing switch M3>the area of the first sensing switch M1.

The first sensing switch M1 is coupled to the second current protection circuit 24 and the output voltage VOUT respectively to generate a second sensing current IS2 according to an input current IIN. The second sensing switch M3 is coupled to the input voltage VIN and the first current protection circuit 22 respectively to generate a first sensing current IS1 according to an output current IL. The power switch M2 is coupled to the input voltage VIN and the output voltage VOUT respectively to receive the input current IIN and provide the output current IL.

The switch circuit 20 receives the input current TIN, outputs the output current IL, generates the first sensing current IS1 according to the output current IL and generates a second sensing current IS2 according to the input current IIN. The input current TIN is the total current flowing into the switch circuit 20 from the input terminal IN. The output current IL is a current flowing into a load from the switch circuit 20. The input current IIN will be equal to the sum of the output current IL, the first sensing current IS1 and the second sensing current IS2. The relationship between the output current IL and the first sensing current IS1 is related to the area of the power switch M2 and the second sensing switch M3. The relationship between the input current IIN and the second sensing current IS2 is related to the area of the power switch M2 and the first sensing switch M1. Because the area of the power switch M2 is much larger than the area of the first sensing switch M1 and the second sensing switch M3, when there is a load, the first sensing current IS1 and the second sensing current IS2 can be ignored, so that the output current IL is approximately equal to the input current TIN.

The selection circuit 26 receives the output voltage VOUT and generates a selection signal VS according to the output voltage VOUT to selectively enable the first current protection circuit 22 or the second current protection circuit 24.

In detail, when the selection circuit 26 receives the output voltage VOUT, the selection circuit 26 will compare the output voltage VOUT with a default voltage VTH. If the comparison result of the selection circuit 26 is that the output voltage VOUT is higher than the default voltage VTH, then the selection circuit 26 will output a high-level selection signal VS to enable the first current protection circuit 22. If the comparison result of the selection circuit 26 is that the output voltage VOUT is lower than the default voltage VTH, then the selection circuit 26 will output a low-level selection signal VS to enable the second current protection circuit 24. Since the sensing voltages are all high voltages instead of being controlled according to the conventional low-voltage error amplification signal, so that the current sensing errors can be greatly reduced.

When the first current protection circuit 22 is enabled, the first current protection circuit 22 will generate the control voltage VG to the switch circuit 20 to control an on-resistance (RON) of the power switch M2 to clamp an upper limit of the output current IL.

When the second current protection circuit 24 is enabled, the second current protection circuit 24 will generate the control voltage VG to the switch circuit 20 to control the on-resistance of the power switch M2 to clamp a lower limit of the output current IL.

Figure 3:
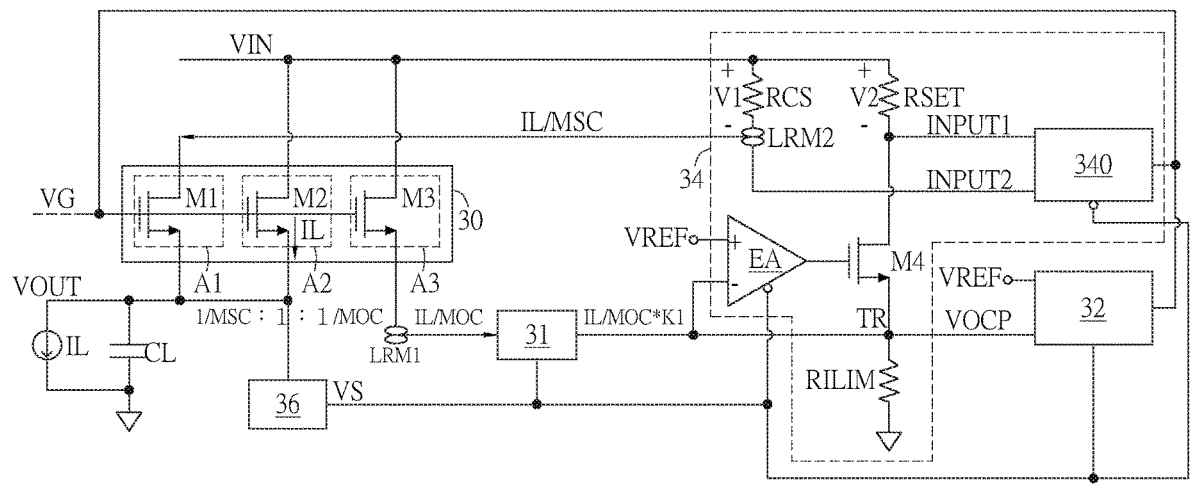
FIG. 3 illustrates a detailed schematic diagram of a power switch circuit 3.

Please refer to FIG. 3. FIG. 3 illustrates a detailed schematic diagram of the power switch circuit 3.

As shown in FIG. 3, the power switch circuit 3 includes a switch circuit 30, a current mirror 31, a first current protection circuit 32, a second current protection circuit 34, a selection circuit 36, a capacitor CL and a current source IL. The capacitor CL and the current source IL are coupled in parallel between the output voltage VOUT and the ground terminal. The switch circuit 30 and the current mirror 31 are coupled by a low-resistance metal connecting line LRM1.

In fact, the first current protection circuit 32 can be an over-current protection (OCP) circuit and the second current protection circuit 34 can be a short-circuit current protection (SCP) circuit, but not limited to this.

The switch circuit 30 is coupled between the input voltage VIN and the output voltage VOUT. The switch circuit 30 is a single cell including a first area A1, a second area A2 and a third area A3 used as the first sensing switch M1, the power switch M2 and the second sensing switch M3 respectively, so that the first sensing switch M1, the power switch M2 and the second sensing switch M3 are in the same cell. The first sensing switch M1, the power switch M2 and the second sensing switch M3 are common gate and are all controlled by the control voltage VG.

The first sensing switch M1 is coupled between the second current protection circuit 34 and the output voltage VOUT. The power switch M2 is coupled between the input voltage VIN and the output voltage VOUT. The second sensing switch M3 is coupled between the input voltage VIN and the current mirror 31.

In fact, the area of the power switch M2 is much larger than the area of the first sensing switch M1 and the second sensing switch M3, and the area of the second sensing switch M3 is larger than the area of the first sensing switch M1.

For example, as shown in FIG. 3, it is assumed that the output current IL flows through the power switch M2, and the area ratio of the first sensing switch M1, the power switch M2 and the second sensing switch M3 is (1/MSC): 1:(1/MOC), then the second sensing current generated by the first sensing switch M1 is IL/MSC and it flows from the second current protection circuit 34 to the first sensing switch M1, and the first sensing current generated by the second sensing switch M3 is (IL/MOC) and it flows from the second sensing switch M3 to the current mirror 31.

When the current mirror 31 receives the first sensing current (IL/MOC), the current mirror 31 reduces the first sensing current to (IL/MOC*K1) by the ratio K1 and then outputs the reduced first sensing current, and generates a first sensing voltage VOCP to the first current protection circuit 32 through the first resistor RILIM, that is to say, the first sensing voltage VOCP=(IL/MOC*K1)*RILIM. The first resistor RILIM can be an external resistor, but not limited to this.

The first current protection circuit 32 obtains a first sensing current signal (which can be a current signal or a voltage signal) through the second sensing switch M3, and provides a control voltage VG to the switch circuit 30 according to the first sensing current signal. In fact, the first current protection circuit 32 is an error amplifier, and an input terminal TR of the first current protection circuit 32 receives a first sensing current signal (for example, a first sensing voltage VOCP related to the first sense current IL/MOC outputted by the second sense switch M3) and another input terminal of the first current protection circuit 32 receives a reference voltage VREF. The first current protection circuit 32 generates the control voltage VG to the switch circuit 30 according to the first sensing voltage VOCP and the reference voltage VREF. When the first sensing voltage VOCP is a first default value, the control voltage VG controls the on-resistance of the power switch M2, so that the output current IL flowing through the power switch M2 can maintain a second default value to clamp an upper limit of the output current IL.

The second current protection circuit 34 includes a voltage follower EA including a transistor M4, a second resistor RSET, a third resistor RCS and a current protection unit 340. The second resistor RSET and the third resistor RCS are matched with each other; that is to say, the second resistor RSET and the third resistor RCS can be mutually dependent resistors manufactured by the same process, which can eliminate sensing errors generated by the resistors.

The positive input terminal+of the voltage follower EA receives the reference voltage VREF and the negative input terminal−of the voltage follower EA is coupled to the current mirror 31 and receives the reduced first sensing current (IL/MOC*K1) outputted by the current mirror 31. The transistor M4 is coupled between the second resistor RSET and the first resistor RILIM. The first resistor RILIM is coupled between the transistor M4 and the ground terminal. One terminal of the second resistor RSET is coupled to the input voltage VIN and the other terminal of the second resistor RSET is coupled to the current protection unit 340 and the transistor M4 respectively. One terminal of the resistor RCS is coupled to the input voltage VIN and the other terminal of the resistor RCS is coupled to the first sensing switch M1 and the current protection unit 340 in the switch circuit 30 respectively through a low-resistance metal connecting line LRM2. The current protection unit 340 is coupled to the switch circuit 30, the first current protection circuit 32, the second resistor RSET, the resistor RCS and the voltage follower EA respectively.

The second current protection circuit 34 obtains a second sensing current signal (which can be a current signal or a voltage signal) through the first sensing switch M1 and provides the control voltage VG to the switch circuit 30 according to the second sensing current signal. In fact, the current protection unit 340 in the second current protection circuit 34 is an error amplifier. When the second current protection circuit 34 is enabled, the voltage follower EA is also enabled to control the first input terminal INPUT1 of the current protection unit 340 to receive the reference voltage VREF, and the second input terminal INPUT2 of the current protection unit 340 receives the second sensing current signal (e.g., a second sensing voltage related to the second sensing current IL/MSC generated by the first sensing switch M1). The second current protection circuit 34 generates the control voltage VG to the switch circuit 30 according to the second sensing voltage and the reference voltage VREF. When the second sensing voltage is a third default value, the control voltage VG controls the on-resistance of the power switch M2, so that the output current IL flowing through the power switch M2 maintains a fourth default value to clamp a lower limit of the output current IL.

Figure 4:
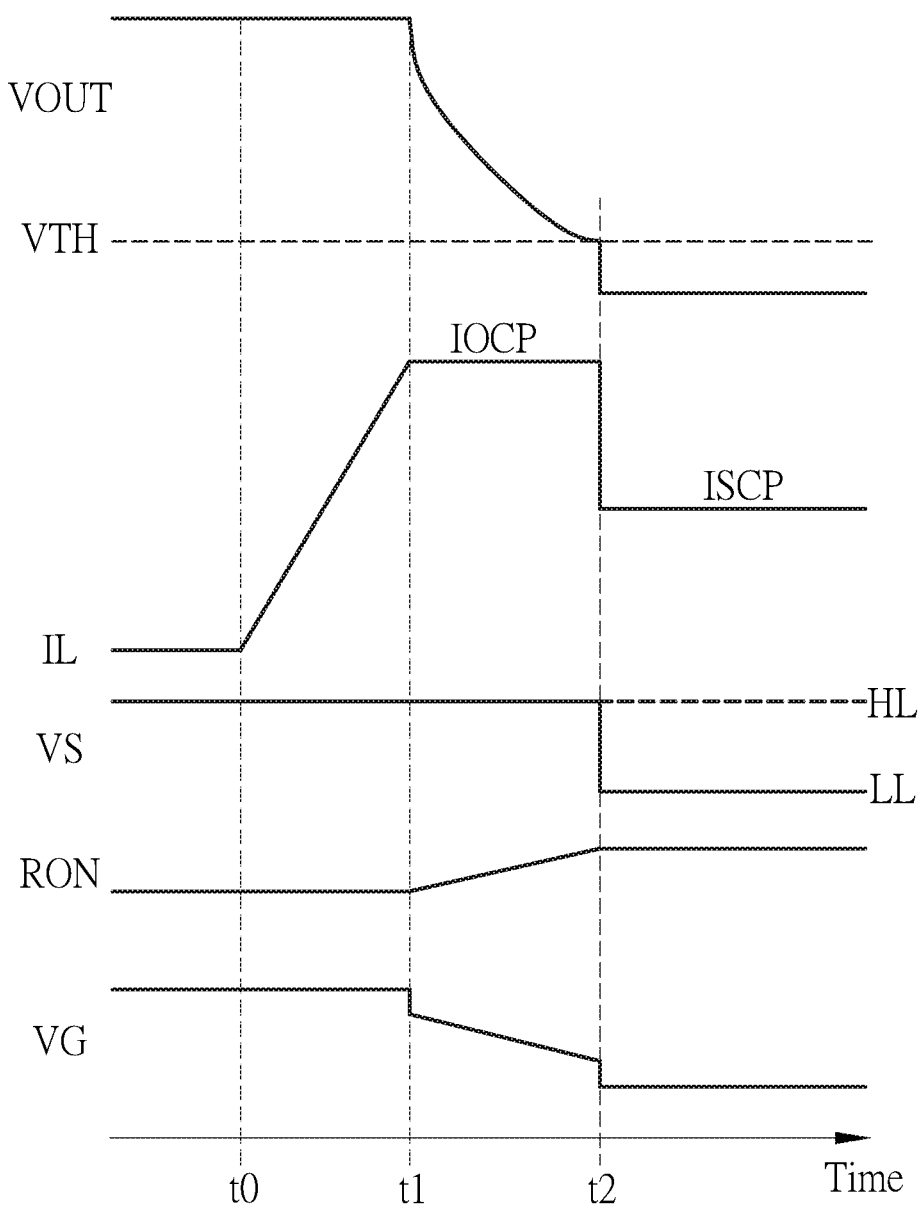
FIG. 4 illustrates timing diagrams of an output voltage VOUT, an output current IL, a selection signal VS, an on-resistance RON and a control voltage VG when the power switch circuit 3 is operated.

Please refer to FIG. 4. FIG. 4 illustrates timing diagrams of the output voltage VOUT, the output current IL, the selection signal VS, the on-resistance RON and the control voltage VG when the power switch circuit 3 is operated. As shown in FIG. 4, its operation timing is described in detail as follows:

At time t0, the power switch circuit 3 is coupled to the load, and the output current IL starts to rise, so that the output voltage VOUT can be maintained at a fixed value during the period from the time t0 to the time t1. During the period from the time t0 to the time t1, since the output voltage VOUT is higher than the default voltage VTH, the selection signal VS outputted by the selection circuit 36 is high-level HL to enable the current mirror 31 and the first current protection circuit 32, and the voltage follower EA and the second current protection circuit 34 are disabled. During the period from the time t0 to the time t1, the control voltage VG outputted by the first current protection circuit 32 is maintained at a fixed value, and the on-resistance RON of the power switch M2 is also maintained at a fixed value.

At the time t1, the control voltage VG outputted by the first current protection circuit 32 will clamp the output current IL at an output current upper limit IOCP, so that the output current IL cannot continue to rise, so that the output voltage VOUT cannot be maintained at a fixed value and began to drop. During the period from the time t1 to the time t2, since the output voltage VOUT is still higher than the default voltage VTH, the selection signal VS outputted by the selection circuit 36 is high-level HL, the current mirror 31 and the first current protection circuit 32 are enabled, and the voltage follower EA and the second current protection circuit 34 are disabled. During the period from the time t1 to the time t2, the control voltage VG outputted by the first current protection circuit 32 decreases linearly, so that the on-resistance RON of the power switch M2 increases linearly.

It is assumed that the reference voltage VREF is equal to the first sensing voltage VOCP, since the first sensing voltage VOCP is equal to the reduced first output current (IL/MOC*K1) multiplied by the resistance of the first resistor RILIM, it can be obtained that the reference voltage VREF=(IL/(MOC*K1))*RILIM; that is to say, the output current upper limit IOCP=IL= (VREF*MOC*K1)/(RILIM)  (Equation 1)

At the time t2, when the selection circuit 36 senses that the falling output voltage VOUT is lower than the default voltage VTH, the selection signal VS outputted by the selection circuit 36 is changed to the low-level LL, the current mirror 31 and the first current protection circuit 32 are disabled, and the voltage follower EA and the second current protection circuit 34 are enabled, so that the second current protection circuit 34 outputs the control voltage VG to clamp the output current IL at the output current lower limit ISCP. After the time t2, the control voltage VG outputted by the second current protection circuit 34 is maintained at a fixed value, and the on-resistance RON of the power switch M2 is also maintained at a fixed value.

It is assumed that the voltage V1 across the third resistor RCS is equal to the voltage V2 across the second resistor RSET, since the voltage V1 across the third resistor RCS is equal to the product of the second sensing current (IL/MSC) generated by the first sensing switch M1 and the resistance of the third resistor RCS, and the voltage V2 across the second resistor RSET is equal to the product of (the reference voltage VREF/the resistance of the first resistor RILIM) and the resistance of the second resistor RSET, so that it can be obtained that (IL/MSC)*RCS=(VREF/RILIM)*RSET;

that is to say, the output current lower limit

ISCP=IL=(VREF/RILIM)*(RSET/RCS)*MSC  (Equation 2)

It is assumed that the output current upper limit IOCP is K times the output current lower limit ISCP; that is to say, IOCP=K*ISCP, according to the above-mentioned Equations 1 and 2, it can be obtained that (VREF*MOC*K1)/(RILIM)=K*(VREF/RILIM)* (RSET/RCS)*MSC; that is to say, the second resistance RSET=(MOC*K1*RCS)/ (K*MSC)  (Equation 3)

In this way, the power switch circuit 3 can clamp the output current IL at the output current upper limit IOCP through the first current protection circuit 32 or clamp the output current IL at the output current lower limit ISCP through the second current protection circuit 34 according to the comparison result of the output voltage VOUT and the default voltage VTH to provide more stable and accurate output current IL.

In addition, it can be known from Equations 1 and 2 that the output current upper limit IOCP can be changed to a multiple K of the output current lower limit ISCP by selecting the value of the first resistor RILIM, which is beneficial to the design of the power switch circuit.

Compared to the prior arts, the power switch circuit of the invention uses sub-cells of its power switch to sense the current flowing through the power switch instead of using conventional metal resistors coupled in series, the current sensing error can be greatly reduced. Because the sensing voltages are all high voltages, they are not controlled based on the conventional error amplification signal (low voltage), so that the current sensing error can be greatly reduced to within 5%.

The power switch circuit of the invention clamps an upper limit of the output current (IL) through the current protection circuit and clamps a lower limit of the output current through the short-circuit current protection circuit, so that it can provide more stable and accurate output current.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power switch circuit, coupled between an input terminal and an output terminal, configured to receive an input voltage and provide an output voltage, the power switch circuit comprising:
   a switch circuit, coupled between the input terminal and the output terminal, comprising a first sensing switch, a second sensing switch and a power switch, wherein the first sensing switch, the second sensing switch and the power switch are the same cell;
   a first current protection circuit, coupled to the second sensing switch;
   a second current protection circuit, coupled to the first sensing switch; and
   a selection circuit, coupled to the switch circuit, the first current protection circuit and the second current protection circuit respectively,
   wherein the selection circuit generates a selection signal according to the output voltage to selectively enable the first current protection circuit and the second current protection circuit.

2. The power switch circuit of claim 1, wherein the first sensing switch, the power switch and the second sensing switch are common gate.

3. The power switch circuit of claim 1, wherein the selection circuit compares the output voltage with a default voltage to obtain a comparing result and generates the selection signal according to the comparing result.

4. The power switch circuit of claim 1, wherein when the output voltage is less than a default voltage, the selection circuit generates the selection signal having a first level to enable the second current protection circuit.

5. The power switch circuit of claim 1, wherein when the output voltage is greater than a default voltage, the selection circuit generates the selection signal having a second level to enable the first current protection circuit.

6. The power switch circuit of claim 1, wherein the power switch and the second sensing switch are coupled to the input terminal, and the power switch and the first sensing switch are coupled to the output terminal.

7. The power switch circuit of claim 1, wherein the first current protection circuit obtains a first sensing current signal through the second sensing switch and provides a control voltage to the switch circuit according to the first sensing current signal.

8. The power switch circuit of claim 7, wherein when the first sensing current signal is a first default value, an on-resistance of the power switch is controlled by the control voltage, so that an output current flowing through the power switch maintains a second default value.

9. The power switch circuit of claim 1, wherein the second current protection circuit obtains a second sensing current signal through the first sensing switch and provides a control voltage to the switch circuit according to the second sensing current signal.

10. The power switch circuit of claim 9, wherein when the second sensing current signal is a third default value, an on-resistance of the power switch is controlled by the control voltage, so that an output current flowing through the power switch maintains a fourth default value.

11. The power switch circuit of claim 1, further comprising a current mirror circuit coupled between the second sensing witch and the first current protection circuit.

* * * * *